United States Patent
Wu et al.

(10) Patent No.: US 8,342,693 B2
(45) Date of Patent: Jan. 1, 2013

(54) DYNAMIC PROJECTION ADJUSTING METHOD AND PROJECTION DISPLAY DEVICE

(75) Inventors: Tsung-Hsun Wu, Taoyuan County (TW); Ching-Shuai Huang, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 347 days.

(21) Appl. No.: 12/839,389

(22) Filed: Jul. 19, 2010

(65) Prior Publication Data

US 2011/0019164 A1 Jan. 27, 2011

(30) Foreign Application Priority Data

Jul. 27, 2009 (TW) ................................ 98125223 A

(51) Int. Cl.
*G03B 21/14* (2006.01)

(52) U.S. Cl. .............................. 353/84; 353/85; 348/743
(58) Field of Classification Search .................... 353/31, 353/34, 37, 84, 85; 348/742, 743, 771
See application file for complete search history.

(56) References Cited

U.S. PATENT DOCUMENTS

| | | | | |
|---|---|---|---|---|
| 7,845,805 B2* | 12/2010 | Okamoto et al. | | 353/85 |
| 2006/0050246 A1* | 3/2006 | Moench et al. | | 353/85 |
| 2011/0170073 A1* | 7/2011 | Hasegawa | | 353/84 |
| 2011/0304659 A1* | 12/2011 | Lee et al. | | 345/694 |

\* cited by examiner

*Primary Examiner* — William C Dowling

(57) ABSTRACT

The present invention discloses a dynamic projection adjusting method for a projection display device to display output images. The projection display device includes a light source driven by a periodic pulse signal. The dynamic projection adjusting method includes the following steps: (a) determining a brightness parameter of the output image; (b) adjusting the periodic pulse signal according to the brightness parameter and (c) driving the light source with the periodic pulse signal.

26 Claims, 5 Drawing Sheets

DYNAMIC PROJECTION ADJUSTING METHOD AND PROJECTION DISPLAY DEVICE

BACKGROUND OF THE INVENTION

1. Field of the Invention

This invention relates to a dynamic projection adjusting method and a projection display device and; specifically to a projection adjusting method and a projection display device dynamically adjusting projection images according to brightness parameters of output images.

2. Description of the Prior Art

As consumer electronic devices have gradually entered the market, many projection display products for different consumer groups have been developed. The above-mentioned projection display products include digital light processing (DLP) projection devices, liquid crystal display (LCD) projection devices and liquid crystal on silicon (LCOS) projection devices, wherein the DLP projection devices have the advantages of high brightness, accurate color tone, fast response time, low screen noise, and small size. Therefore, the DLP projection devices have become one of the most popular new generation projection systems.

As far as the commonly known DLP (digital light processing) projection devices on the market are concerned, the main structure is based on micro electro mechanical systems (MEMS) and uses digital micromirror devices (DMD). The DLP projection device includes a light source, a color wheel module, a light pipe, a lens set for light separating and coupling, a digital micromirror device and an imaging lens. Please refer to FIG. 1, a schematic view illustrating a conventional projection display device is provided. The projection display device 1 in FIG. 1 is a DLP projection device, wherein the light generated by the light source 10 will pass through the color wheel 12 which has light filtering regions for different colors. For different projection display products, the light passing through the color wheel will then pass through the light pipe and the lens set for light separating and coupling processes. Finally, the light will be concentrated on the digital micromirror device 14 (DMD), wherein driving electrodes will be used to control the tilt angles and the deflection time of the micromirrors on the DMD 14 to switch the reflection direction of the light so that the light is projected by the imaging lens 16 onto a screen to form images. Compared with projection devices based on other principles, the DLP projection devices have the advantages of high brightness, accurate color tone, fast response time, low screen noise and small size.

As mentioned above, in conventional DLP projection devices, the light generated by the light source 10 is separated by the color wheel. Conventional DLP projection devices can be classified into different categories according to different applications. For instance, traditional color wheel with red, green and blue color regions are used when color lifelikeness and saturation are to be enhanced. The color wheel with white, green, blue and red color regions are used when high image brightness is to be enhanced. Recently, a color wheel having pure color regions of green, blue and red plus mixed colors of cyan (green plus blue), yellow (red plus green) and white has been developed.

As for the user experience of the projection device, the current requirement requires projection devices to perform excellent performances in various attributes, such as projection size, brightness, lumen, contrast ratio and color saturation to meet the consumers' expectation.

According to the current industry standard, the contrast of the projection device is usually defined by the ratio between the flux-white and flux-black.

In order to improve the contrast of the image, conventional projection devices usually adjust the power of the light source, such as the wattage of light bulbs. For instance, the contrast of the images under the normal display mode can be defined by:

Contrast=Flux-White (Full Power)/Flux-Black (Full Power)

Under the enhanced contrast mode, the power of the light source is decreased to adjust the brightness contrast of overall display images and defined by:

Adjusted Contrast=Flux-White (Full Power)/Flux-Black (Full power*Adjustment Ratio)

In this way, the contrast is increased in direct proportional to the reduction of the power of the light source. However, conventional contrast increasing technology requires frequently switching of the total power of the light source which greatly shortens the light source's life and creates additional maintenance costs for user as well as adversary influences on the stability the projection device's stability.

In order to solve the above-mentioned problems, a dynamic projection adjusting method and a projection display device for solving the above-mentioned problems and improving the contrast of the display images are required.

SUMMARY OF THE INVENTION

One aspect of the present invention is to provide a dynamic projection adjusting method for a projection display device to display output images. The projection display device comprises a light source driven by periodic pulse signal. The periodic pulse signal comprises a relatively high penetration signal interval and a relatively low penetration signal interval, wherein the relatively high penetration signal interval and the relatively low penetration signal interval have a first interval power and a second interval power, respectively.

According to one embodiment of the present invention, the dynamic projection adjusting method comprises the steps of determining a brightness parameter of output images; adjusting a periodic pulse signal by adjusting at least one of the first interval power of the relatively high penetration signal interval and the second interval power of the relatively low penetration signal interval according to the brightness parameter, wherein the first interval power of the relatively high penetration signal interval and the second interval power of the relatively low penetration signal interval are inversely adjusted when both are to be adjusted; and driving the light source by the periodic pulse signal.

Another aspect of the present invention is to provide a projection display device for displaying output images.

According to another embodiment of the present invention, the projection display device comprises a light source, a driving circuit, and a processing module. The driving circuit generates a periodic pulse signal to drive the light source, wherein the periodic pulse signal comprises the relatively high penetration signal interval and the relatively low penetration signal interval. The relatively high penetration signal interval and the relatively low penetration signal interval have a first interval power and a second interval power, respectively. The processing module is electrically connected to the driving circuit and determines a brightness parameter of the output images. The processing module then adjusts the periodic pulse signal by adjusting at least one of the first interval power of the relatively high penetration signal interval and the second interval power of the relatively low penetration signal interval according to the brightness parameter, wherein the first interval power of the relatively high penetration signal interval and the second interval power of the relatively low penetration signal interval are inversely adjusted when both are to be adjusted.

Compared with the prior art, the dynamic projection adjusting method and the projection display device using the dynamic adjusting method in the invention improve the contrast and color richness of projection images by means of dynamic adjusting according to different characteristics of the images.

The advantage and essence of the present invention can be further understood via following descriptions and drawings.

DETAILED DESCRIPTION OF THE PREFERRED EMBODIMENT

Figure 1:
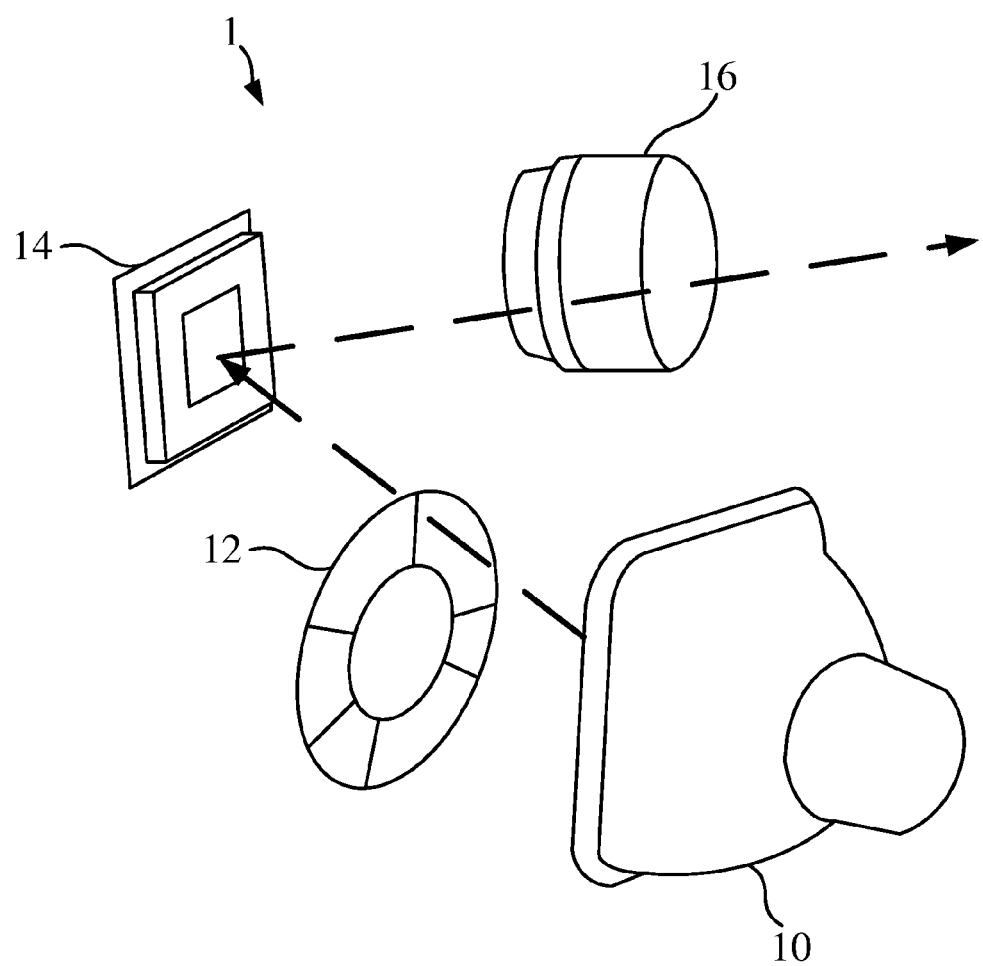
FIG. 1 is a schematic view of a conventional projection display device.
Figure 2:
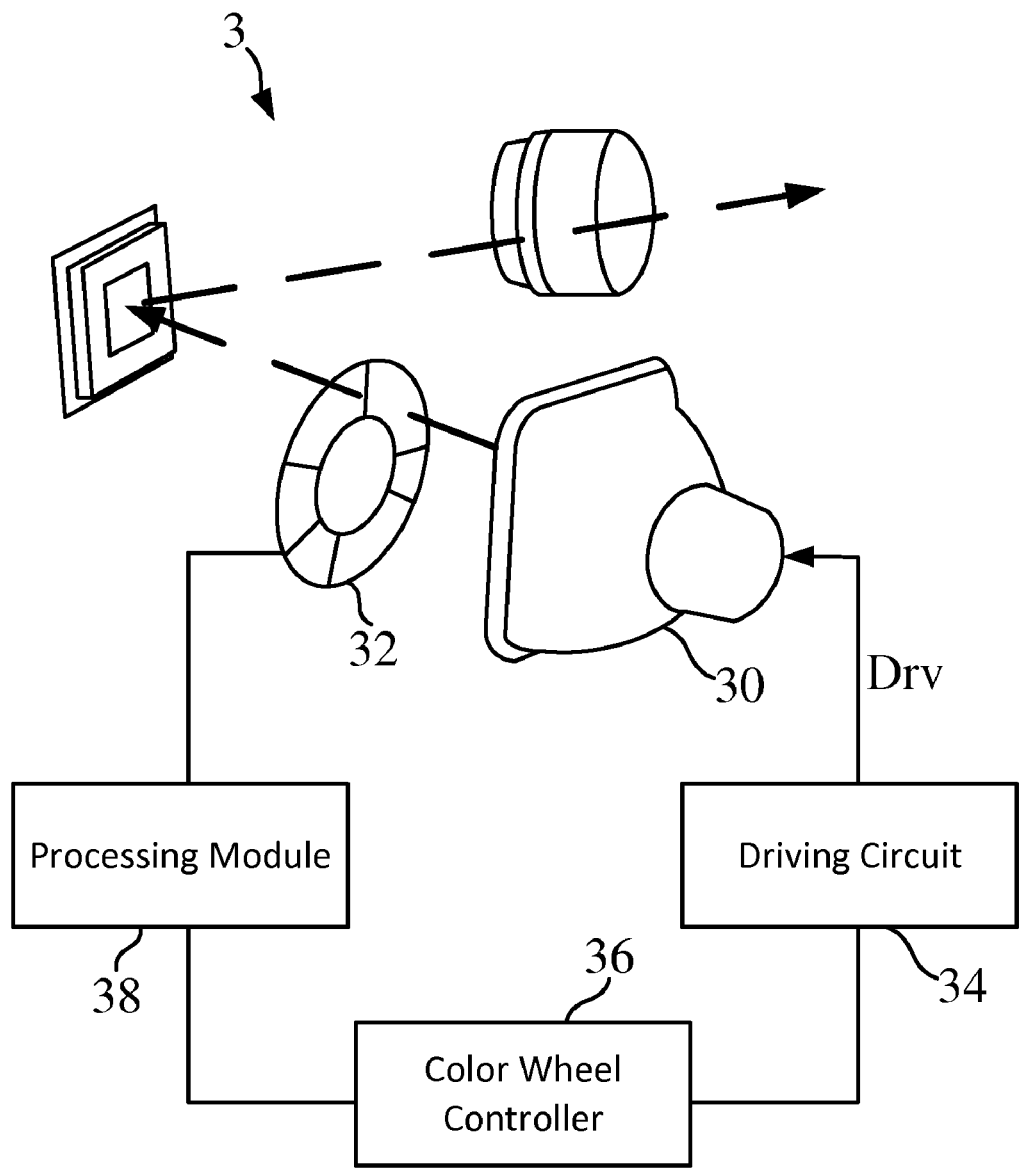
FIG. 2 is a schematic view illustrating the projection display device in one embodiment of the present invention.

Please refer to FIG. 2 which illustrates the projection display device 3 according to one embodiment of the present invention. The projection display device 3 may be extensively used in household, entertainment and corporate environment to display specific output images, such as television images, movie, or presentation. As FIG. 2 shows, in the present embodiment, the projection display device 3 includes a light source 30, a color wheel 32, a driving circuit 34, a processing module 36, and a color wheel controller 38 but is not limited thereto. In order to actually project images, the projection display device 3 may further include a light pipe, a light separating and coupling lens set, a digital micromirror device, and an imaging lens as conventionally known which will not be further illustrated and explained for concise purposes.

Figure 3:
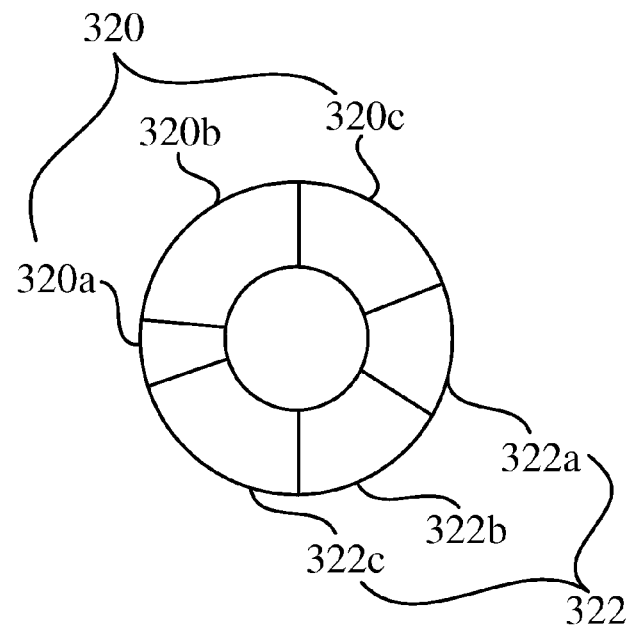
FIG. 3 is a schematic view illustrating the color wheel in one embodiment of the present invention.

In the present embodiment, the light source 30 generates light which is then projected through the color wheel 32. Please refer to FIG. 3 which illustrates a schematic view of the color wheel 32 in one embodiment of the present invention. The color wheel 32 can be disposed with different color regions for allowing the lights of different bandwidth to pass therethrough. The color wheel 32 in FIG. 3 has three pure color regions 322a, 322b, 322c for red, blue and green, and three mixed color regions 320a, 320b, 320c for yellow (blue plus red), dark green (blue plus green) and white. With respect to the optical spectrum, three pure color regions (322a, 322b, 322c) can only allow the light of small bandwidth to pass through and form a relatively low penetration region 322, wherein the relatively low penetration region 322 of the color wheel 32 has smaller luminous flux but can present color with more saturation. On the other hand, with respect to the optical spectrum, the mixed color regions (320a, 320b, 320c) allows the light of greater bandwidth to pass through and form a relatively high penetration region 320, wherein the relatively high penetration region 320 has greater luminous flux and can present high display brightness.

It should be noted that the projection display device 3 is not limited to specific number of colors (three colors, four colors, or six colors), color scheme (order or ratio between colors) or specific color wheel structure. The projection display device 3 can work with other compatible color filter module to form the relatively high and the relatively low penetration regions. The color wheel controller 38 can be used to control the operating speed and the cycle of the color wheel 32.

The driving circuit 34 can be used to generate a periodic pulse signal Dry to drive the light source 30. In practice, the periodic pulse signal Dry can be the periodic current or voltage signals. In the present embodiment, the periodic pulse signal Dry and the operating cycle of the color wheel 32 are relatively correlated, such as to have a synchronized or multiplied cycle.

The processing module 36 and the driving circuit 34 are electrically connected, wherein the processing module 36 determines the brightness parameter of the output image to be generated. In the present invention, the processing module 36 controls the driving circuit 34 to adjust the periodic pulse signal Dry according to the brightness parameter of the output image, in order to selectively raise the contrast or the color saturation of the output image. Hereinafter the processes of adjusting the periodic pulse signal Dry will be described in detail.

Figure 4:
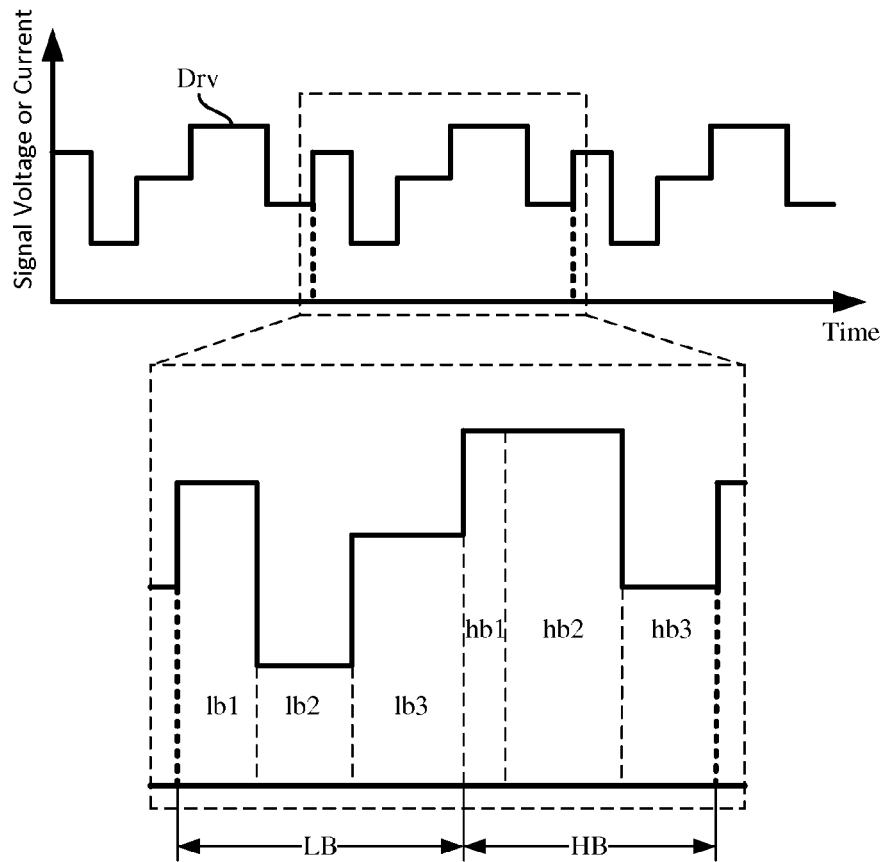
FIG. 4 is a timing diagram illustrating the periodic pulse signal in one embodiment of the present invention.

Please refer to FIG. 4 which illustrates the timing diagram of the periodic pulse signal Pry in one embodiment of the present invention. As FIG. 4 shows, the periodic pulse signal Dry is a periodic voltage or current signal. In the present embodiment, the periodic pulse signal Dry in every cycle has a relatively high penetration signal interval HB and a relatively low penetration signal interval LB.

In the present embodiment, the periodic pulse signal Dry has a total periodic pulse power while the relatively high penetration signal interval HB and the relatively low penetration signal interval LB have a first interval power and a second interval power, respectively.

Each of the relatively high penetration signal interval HB and the relatively low penetration signal interval LB may have at least one sub-interval. In the present embodiment, the relatively high penetration signal interval HB has three sub-intervals (hb1, hb2, hb3) corresponding to three mixed color regions (320a, 320b, 320c) of the color wheel. In this way, the relatively high penetration signal interval HB of the periodic pulse signal Dry corresponds to the relatively high penetration region 320 of the color wheel 32. The relatively low penetration signal interval LB includes three sub-interval (lb1, lb2, lb3) corresponding to three pure color regions (322a, 322b, 322c) of the color wheel 32. In this way, the relatively low penetration signal interval LB of the periodic pulse signal Dry corresponds to the relatively low penetration region 322 of the color wheel 32. However, the present invention is not limited to the number of sub-intervals (three sub-intervals) and the arrangement in the present embodiment. In practice, the number of sub-intervals and the arrangement can be adjusted based on the applications and the processes.

Figure 5:
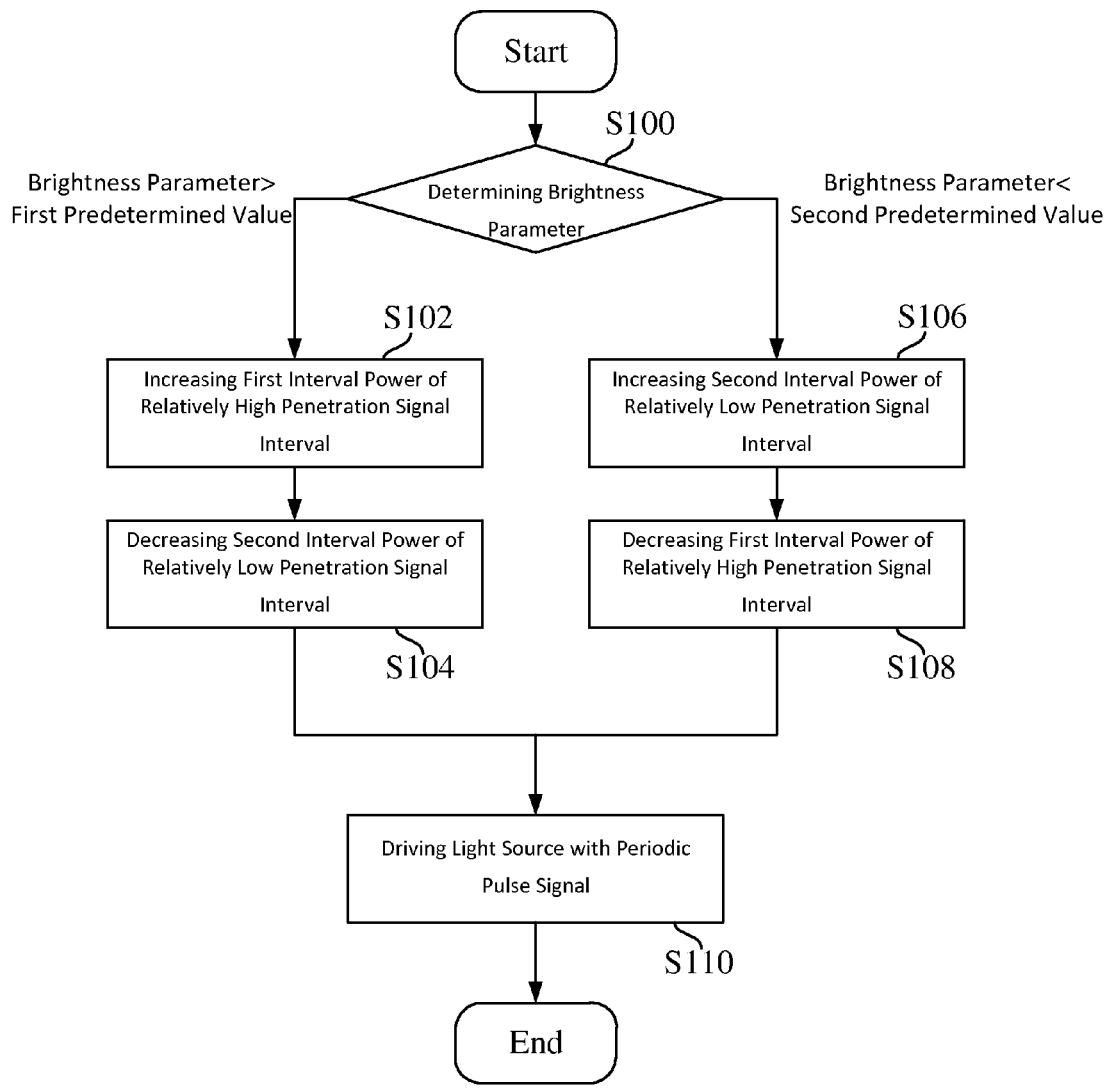
FIG. 5 is a flow chart illustrating the dynamic projection adjusting method in one embodiment of the present invention for adjusting periodic pulse signals.

Please refer to FIG. 5 illustrating a flow chart of the dynamic projection adjusting method in one embodiment of the present invention. The dynamic projection adjusting method of the present invention can coordinate with the projection display device 3 described above or be widely used in compatible projection devices or systems.

Firstly, the dynamic projection adjusting method executes a step S100 to determine a brightness parameter of the output images by the processing module 36.

When the processing module 36 determines that the brightness parameter of the output image is greater than a first predetermined value, i.e., the output image is required to have greater brightness, a step S102 will be executed so that the processing module 36 to controls the driving circuit 34 to increase a first interval power of the relatively high penetration signal interval HB. In practice, the first interval power can be increased by increasing at least one of the voltage and the current of the relatively high penetration signal interval HB. In this way, the ratio of the light generated by the light source 30 and passing through the relatively high penetration region 320 of the color wheel 32 will be increased so as to increase the maximum brightness of the display image.

In the meanwhile, the projection display device 3 can further execute a step S104 in which the second interval power of the relatively low penetration signal interval LB of the periodic pulse signal is decreased. In practice, the second interval power can be decreased by decreasing at least one of the voltage and the current of the relatively low penetration signal interval LB. Here the decreasing of the second interval power substantially corresponds to the increasing of the first interval power so that the total periodic pulse power of the periodic pulse signal remains substantially constant. In other words, the total driving power of the light source remains substantially constant to avoid the adverse effect on the life of the light source due to frequent change of the total power.

Figure 6A:
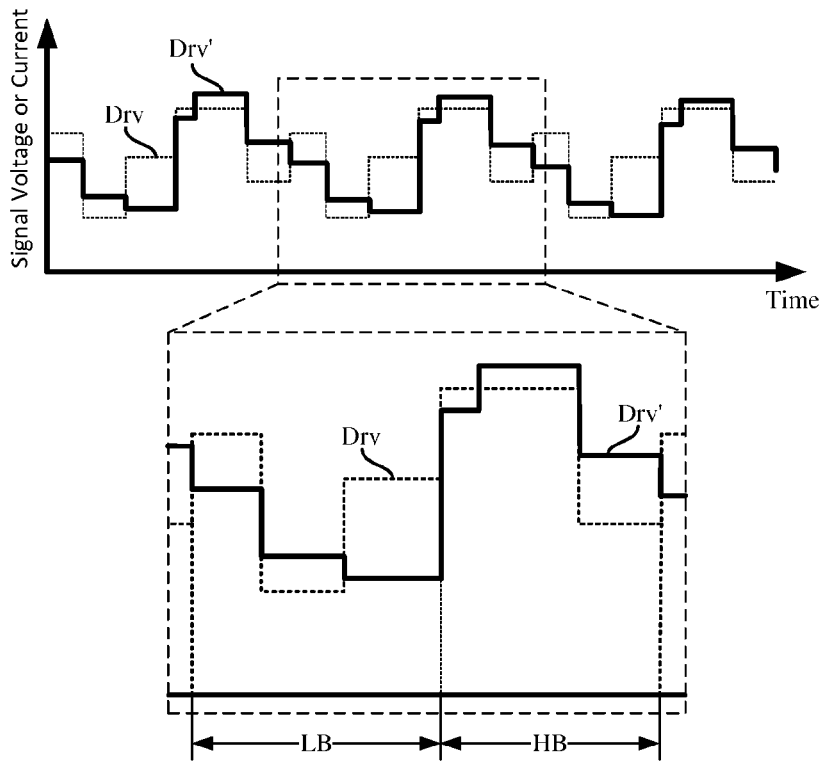
FIG. 6A is a timing diagram illustrating periodic pulse signal dynamically adjusted in one embodiment of the present invention.

Please refer to FIG. 6A illustrating the timing diagram of the periodic pulse signal Drv' after it is adjusted dynamically in steps S102 and S104. As FIG. 6A shows, the difference between the default periodic pulse signal Dry and the adjusted periodic pulse signal Drv' is that the first interval power of the relatively high penetration signal interval HB is increased in step S102, but the increase is not limited to the comprehensive and absolute increase in the voltage or the current for each of the sub-intervals hb1, hb2 and hb3. As FIG. 6A shows, the voltage or the current of the different sub-intervals can be adjusted in different scales (partial or comprehensive) depending on the practical applications. In the present embodiment, the voltage and/or the current of the sub-intervals hb2 and hb3 are/is increased while the voltage and/or the current of the sub-interval hb1 are/is decreased so that the first interval power of the relatively high penetration signal interval HB is increased. Similarly, in step 104 the powers of the sub-intervals in the relatively low penetration signal interval LB are adjusted. In the present embodiment, the voltage and/or the current of the sub-intervals lb1 and lb3 are/is decreased while the voltage and/or the current of the sub-interval lb2 are/is increased to decrease the second interval power of the relatively low penetration signal interval of the periodic pulse signal.

On the other hand, when the processing module 36 determines that the brightness parameter of the output image is smaller than a second predetermined value, i.e. when the output image requires lower brightness, a step S106 is executed in which the processing module 36 controls the driving circuit 34 to increase the second interval power of the relatively low penetration signal interval LB. In practice, the second interval power is increased by increasing at least one of the voltage and the current of the relatively low penetration signal interval LB in the periodic signal interval. In this way, the ratio of the light which is generated by the light source 30 and passes through the relatively low penetration region 322 of the color wheel 32 (including three pure color regions of red 322a, blue 322b and green 322c) is increased in order to improve the color saturation of the display image and lower the brightness of the display image.

Similarly, the projection display device 3 can further execute a step S108 to decrease the first interval power of the relatively high penetration signal interval HB of the periodic pulse signal by decreasing at least one of the voltage and the current of the relatively high penetration signal interval HB. Here, the changes in the amount of the first interval power and the second interval power substantially correspond to each other so that the total periodic pulse power of the periodic pulse signal remains substantially the same. In other words, the driving power of the light source 30 remains substantially the same to prevent the dynamic adjusting method from adversely effecting the light source's life.

Figure 6B:
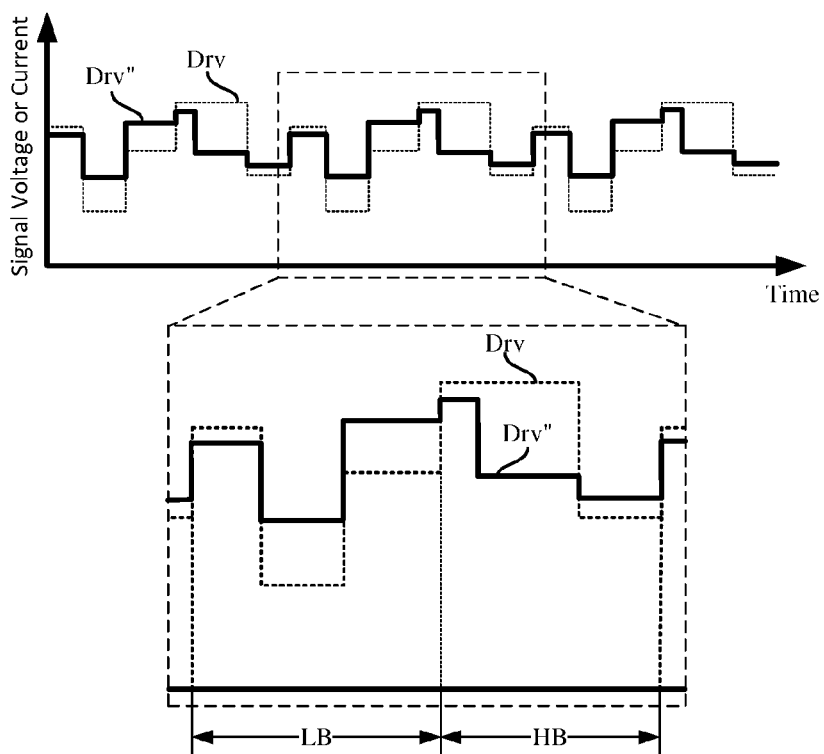
FIG. 6B is a timing diagram illustrating another periodic pulse signal dynamically adjusted in one embodiment of the present invention.

Please refer to FIG. 6B which illustrates a timing diagram of the periodic pulse signal Drv" after it is dynamically adjusted in steps S106 and S108. As FIG. 6B shows, the difference between the adjusted periodic pulse signal Drv" and the default periodic pulse signal Dry is that in the step S106 the second interval power of the relatively low penetration signal interval LB is increased but is not limited to comprehensive and absolute increase in the voltage and/or the current for each of the sub-intervals lb1, lb2 and lb3 of the relatively low penetration signal interval LB. As FIG. 6B shows, the voltage and/or the current in different sub-intervals can be adjusted in different scales (partial or comprehensive) based on practical applications. In the present embodiment, the voltage and/or the current in the sub-intervals lb2 and lb3 are/is increased while the voltage and/or the current in the sub-interval lb1 are/is decreased in order to increase the second interval power of the relatively low penetration signal interval. Similarly, in step S108 the powers of the sub-intervals of the relatively high penetration signal interval HB are individually adjusted. In the present embodiment, the voltage and/or the current in the sub-intervals hb1 and hb2 are/is decreased while the voltage and/or current in the sub-interval hb3 are/is increased in order to decrease the first interval power of the relatively high penetration signal interval HB of the periodic pulse signal.

Finally, the projection display device 3 will perform a step S110 in which the light source 30 is driven according to the periodic pulse signal. With different brightness determination results, the periodic pulse signal for driving the light source 30 can be one of the periodic pulse signals dynamically adjusted in the above-mentioned steps S102~S108 or the default and unadjusted periodic pulse signal.

It should be reminded that the dynamic projection adjusting method and the projection display device of the present invention increase the maximum display brightness of the high brightness image's white screen and decrease the minimum display brightness of the low brightness image's black screen in order to improve the brightness and the contrast of the output images. Overall, the dynamic projection adjusting method and the projection display device of the present invention perform dynamic adjustments to improve the contrast and color saturation of the projection images based on different output image characteristics.

In the embodiments described above, the first predetermined value is greater than or equal to the second predetermined value, wherein the first predetermined value and the second predetermined value are reference values set by the system or the user. In the description above, the brightness parameter of the periodic pulse signal is classified based on the first predetermined value and the second predetermined value, but is not limited thereto. The present invention can divide the brightness parameter of the output images into 2, 3, 4 or more reference values to generate more dynamic periodic pulse signal based on different brightness requirements in order to achieve more diversity in applications.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A dynamic projection adjusting method for a projection display device, the projection display device displaying an output image and including a light source driven by a periodic pulse signal including a relatively high penetration signal interval and a relatively low penetration signal interval, the relatively high penetration signal interval and the relatively low penetration signal interval respectively including a first interval power and a second interval power, the dynamic projection adjusting method comprising the steps of:
   (a) determining a brightness parameter of the output image;
   (b) adjusting the periodic pulse signal by adjusting at least one of the first interval power of the relatively high penetration signal interval and the second interval power of the relatively low penetration signal interval according to the brightness parameter, wherein the first interval power of the relatively high penetration signal interval and the second interval power of the relatively low penetration signal interval are inversely adjusted when both are to be adjusted; and
   (c) driving the light source with the periodic pulse signal.

2. The dynamic projection adjusting method of claim 1, wherein the step (b) comprises: increasing the first interval power of the relatively high penetration signal interval of the periodic pulse signal if the brightness parameter is greater than a first predetermined value.

3. The dynamic projection adjusting method of claim 2, wherein in the step (b) the first interval power is increased by increasing at least one of the voltage and the current of the relatively high penetration signal interval.

4. The dynamic projection adjusting method of claim 2, wherein the step (b) further comprises: increasing the second interval power of the relatively low penetration signal interval of the periodic pulse signal if the brightness parameter is smaller than a second predetermined value.

5. The dynamic projection adjusting method of claim 4, wherein in the step (b) the second interval power is increased by increasing at least one of the voltage and the current of the relatively low penetration signal interval.

6. The dynamic projection adjusting method of claim 4, wherein the step (b) further comprises: decreasing the first interval power of the relatively high penetration signal interval of the periodic pulse signal if the brightness parameter is smaller than the second predetermined value.

7. The dynamic projection adjusting method of claim 6, wherein the periodic pulse signal has a total periodic pulse power, in the step (b) the total periodic pulse power remains substantially constant after the second interval power of the relatively low penetration signal interval of the periodic pulse signal is increased and the first interval power of the relatively high penetration signal interval of the periodic pulse signal is decreased.

8. The dynamic projection adjusting method of claim 6, wherein in step (b) if the brightness parameter is smaller than the second predetermined value,
   the second interval power is increased by increasing at least one of the voltage and the current of the relatively low penetration signal interval; and
   the first interval power is decreased by decreasing at least one of the voltage and the current of the relatively high penetration signal interval.

9. The dynamic projection adjusting method of claim 2, wherein the step (b) further comprises: decreasing the second interval power of the relatively low penetration signal interval of the periodic pulse signal if the brightness parameter is greater than the first predetermined value.

10. The dynamic projection adjusting method of claim 9, wherein the periodic pulse signal has a total periodic power, in the step (b) after the first interval power of the relatively high penetration signal interval of the periodic pulse signal is increased and the second interval power of the relatively low penetration signal interval of the periodic pulse signal is decreased, the total periodic pulse power remains substantially constant.

11. The dynamic projection adjusting method of claim 9, wherein in step (b) if the brightness parameter is greater than the first predetermined value,
   the first interval power is increased by increasing at least one of the voltage and the current of the relatively high penetration signal interval; and
   the second interval power is decreased by decreasing at least one of the voltage and the current of the relatively low penetration signal interval.

12. The dynamic projection adjusting method of claim 4, wherein the first predetermine value is greater than or equal to the second predetermined value.

13. A projection display device for displaying an output image, the projection display device comprising:
   a light source;
   a driving circuit generating a periodic pulse signal to drive the light source, the periodic pulse signal comprising a relatively high penetration signal interval and a relatively low penetration signal interval, the relatively high penetration signal interval and the relatively low penetration signal interval respectively having a first interval power and a second interval power; and
   a processing module electrically connected to the driving circuit, the processing module determining a brightness parameter of the output image and controlling the driving circuit to adjust the periodic pulse signal according to the brightness parameter by adjusting at least one of the first interval power of the relatively high penetration signal interval and the second interval power of the relatively low penetration signal interval, wherein the first interval power of the relatively high penetration signal interval and the second interval power of the relatively low penetration signal interval are inversely adjusted when both are to be adjusted.

14. The projection display device of claim 13, wherein if the processing module determines that the brightness parameter is greater than a first predetermined value, then the processing module controls the driving circuit to increase the first interval power of the relatively high penetration signal interval.

15. The projection display device of claim 14, wherein if the brightness parameter is greater than the first predetermined value, the processing module increases the first interval power by controlling the driving circuit to increase at least one of the voltage and the current of the relatively high penetration signal interval.

16. The projection display device of claim 14, wherein if the brightness parameter is greater than the first predetermined value, the processing module further controls the driving circuit to decrease the second interval power of the relatively low penetration signal interval.

17. The projection display device of claim 16, wherein the periodic pulse signal has a total periodic pulse power, and the total periodic pulse power of the periodic pulse signal remains substantially constant after the processing module controls the driving circuit to increase the first interval power of the relatively high penetration signal interval and to decrease the second interval power of the relatively low penetration signal interval.

18. The projection display device of claim 16, wherein if the brightness parameter is greater than the first predetermined value, the processing module then controls the driving circuit to increase the first interval power by increasing at least one of the voltage and the current of the relatively high penetration signal interval and to decrease the second interval power by decreasing at least one of the voltage and the current of the relatively low penetration signal interval.

19. The projection display device of claim 14, wherein when the processing module determines that the brightness parameter is smaller than a second predetermined value, the processing module then controls the driving circuit to increase the second interval power of the relatively low penetration signal interval.

20. The projection display device of claim 19, wherein if the brightness parameter is smaller than the second predetermined value, the processing module increases the second interval power by controlling the driving circuit to increase at least one of the voltage and the current of the relatively low penetration signal interval.

21. The projection display device of claim 19, wherein if the brightness parameter is smaller than the second predetermined value, the processing module further controls the driving circuit to decrease the first interval power of the relatively high penetration signal interval.

22. The projection display device of claim 21, wherein periodic pulse signal has a total periodic pulse power, and the total periodic pulse power of the periodic pulse signal remains substantially constant after the processing module controls the driving circuit to increase the second interval power of the relatively low penetration signal interval and to decrease the first interval power of the relatively high penetration signal interval.

23. The projection display device of claim 21, wherein if the brightness parameter is smaller than the second predetermined value, the processing module then controls the driving circuit to increase the second interval power by increasing at least one of the voltage and the current of the relatively low penetration signal interval and to decrease the first interval power by decreasing at least one of the voltage and the current of the relatively high penetration signal interval.

24. The projection display device of claim 19, wherein the first predetermined value is greater than or equal to the second predetermined value.

25. The projection display device of claim 13, wherein the light source generates a light, and the projection display device further comprises: a color wheel having a relatively high penetration region and a relatively low penetration region, the light generated by the light source passes through the color wheel, and the relatively high penetration region and the relatively low penetration region correspond to the relatively high penetration signal interval and the relatively low penetration signal interval of the periodic pulse signal, respectively.

26. The projection display device of claim 25, wherein the relatively high penetration region of the color wheel comprises: a mixed color region while the relatively low penetration region comprises a pure color region, the relatively high penetration signal interval corresponds to the mixed color region of the color wheel while the relatively low penetration signal interval corresponds to the pure color region of the color wheel.

* * * * *